(12) United States Patent
Bae

(10) Patent No.: US 12,234,532 B2
(45) Date of Patent: Feb. 25, 2025

(54) COMPOSITE MATERIAL INCLUDING ALUMINUM-BASED MATRIX AND DEVICE ADOPTING THE SAME

(71) Applicant: Industry-Academic Cooperation Foundation, Yonsei University, Seoul (KR)

(72) Inventor: Dong Hyun Bae, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 799 days.

(21) Appl. No.: 17/472,476

(22) Filed: Sep. 10, 2021

(65) Prior Publication Data

US 2022/0081742 A1 Mar. 17, 2022

(30) Foreign Application Priority Data

Sep. 11, 2020 (KR) ........................ 10-2020-0116593

(51) Int. Cl.
*C22C 21/10* (2006.01)
*C21D 10/00* (2006.01)
(Continued)

(52) U.S. Cl.
CPC .............. *C22C 21/10* (2013.01); *C21D 10/00* (2013.01); *H01M 50/119* (2021.01); *B82Y 30/00* (2013.01);
(Continued)

(58) Field of Classification Search
CPC ..... C22C 21/10; C22C 1/1036; C22C 1/1047; C22C 21/00; C22C 32/00; C22C 32/0005; C22C 32/0036; C22C 32/0047; C22C 32/0052; C22C 32/0068; C22C 1/026; C21D 10/00; C21D 2201/05;
(Continued)

(56) References Cited

U.S. PATENT DOCUMENTS 5,735,976 A 4/1998 Chu et al.
6,398,882 B1 6/2002 Chu et al.
(Continued)

FOREIGN PATENT DOCUMENTS

CN 104004944 8/2014
CN 108796251 11/2018
(Continued)

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

There are a composite material including an aluminum-based matrix and a device adopting the same. The composite material including an aluminum-based matrix may include an aluminum-based matrix including a plurality of grains, wherein each of the grains has a plurality of sub-grains; and a self-organized phase present at a sub-grain boundary between the plurality of sub-grains, wherein the self-organized phase has a band structure and includes a solid solution of aluminum and a non-metal element. The sub-grains and the self-organized phase coming into contact with the sub-grains may form a substantially coherent interface. A plurality of dislocations spaced apart from each other may be provided along the coherent interface.

12 Claims, 12 Drawing Sheets

(51) Int. Cl.
   *H01M 50/119*   (2021.01)
   *B82Y 30/00*    (2011.01)
(52) U.S. Cl.
   CPC .... *C21D 2201/05* (2013.01); *C21D 2211/004* (2013.01)
(58) Field of Classification Search
   CPC .......... C21D 2211/004; H01M 50/119; H01M 50/224; H01M 50/22; H01M 2220/20; B82Y 30/00; Y02E 60/10; B22D 21/007
   See application file for complete search history.

(56) References Cited

U.S. PATENT DOCUMENTS

| | | | | |
|---|---|---|---|---|
| 9,410,228 | B2* | 8/2016 | Bae | C22C 32/0084 |
| 9,528,343 | B2* | 12/2016 | Jordan | C22C 1/0416 |
| 10,807,119 | B2* | 10/2020 | Birmingham | B22F 12/53 |
| 2012/0241670 | A1* | 9/2012 | Bae | C22C 32/0052 |
| | | | | 977/734 |
| 2017/0240998 | A1 | 8/2017 | Bae et al. | |
| 2022/0081742 | A1* | 3/2022 | Bae | C22C 21/00 |

FOREIGN PATENT DOCUMENTS

| | | | | |
|---|---|---|---|---|
| CN | 108913933 | | 11/2018 | |
| EP | 3342897 | A2 | 7/2018 | |
| KR | 1996-0026634 | | 7/1996 | |
| KR | 10-2011-0065288 | | 6/2011 | |
| KR | 10-1599632 | | 3/2016 | |
| KR | 10-2018-0128384 | | 12/2018 | |
| KR | 10-2019-0089809 | | 7/2019 | |
| KR | 102058819 | B1* | 1/2020 | ......... C22B 21/0084 |
| KR | 10-2078964 | B1 | 2/2020 | |

* cited by examiner

COMPOSITE MATERIAL INCLUDING ALUMINUM-BASED MATRIX AND DEVICE ADOPTING THE SAME

CROSS-REFERENCE TO RELATED APPLICATION

This application claims priority to and the benefit of Korean Patent Application No. 10-2020-0116593, filed on Sep. 11, 2020, the disclosure of which is incorporated herein by reference in its entirety.

BACKGROUND

1. Field of the Invention

The present invention relates to a metal-based composite material, and more particularly, to a composite material including an aluminum-based matrix and a device adopting the same.

2. Discussion of Related Art

In general, aluminum or aluminum alloys may be manufactured into various shapes using its characteristics such as lightweightness and high durability, and has a wide range of industrial applications. Aluminum itself is easily deformed due to its low strength, but aluminum alloys have enough high strength and high reliability to be applicable to the automotive or aircraft industry because the strength of the aluminum alloys is improved by an additive element. In recent years, because the aluminum alloys have excellent mechanical strength and low specific gravity, their applications have expanded to various fields such as construction, chemistry, robots, and electronics as well as the automotive and aircraft fields.

However, aluminum and aluminum alloys have a problem in that they have poor processability due to their low elongation. Even when an alloying element is added to an aluminum-based matrix, an elongation may not be improved, but rather reduced. Also, when more types of elements are added to the aluminum-based matrix, it is somewhat expected to improve characteristics such as strength, but an effect of improving the strength is limited and insufficient.

SUMMARY OF THE INVENTION

Therefore, it is one object of the present invention to provide a composite material including an aluminum-based matrix, which has high elongation characteristics and also exhibits excellent mechanical properties such as strength.

It is another object of the present invention to provide a composite material including an aluminum-based matrix, which has excellent mechanical properties and also exhibits improved thermal conductivity characteristics.

It is still another object of the present invention to provide a method of manufacturing the above-described composite material including an aluminum-based matrix.

The technical problems to be solved in the present invention are not limited to the above-described technical problems, and thus it should be understood that technical problems which are not described in this specification will be made apparent from the detailed description of the invention by those skilled in the art.

According to an aspect of the present invention, there is provided a composite material including an aluminum-based matrix, which includes an aluminum-based matrix including a plurality of grains, wherein each of the grains has a plurality of sub-grains; and a self-organized phase present at a sub-grain boundary between the plurality of sub-grains, wherein the self-organized phase has a band structure and includes a solid solution of aluminum and a non-metal element, wherein a deviation in lattice constant between the self-organized phase and the sub-grains is in a range of 1% to 5%.

A plurality of dislocations spaced apart from each other may be included along the coherent interface.

The self-organized phase may have a lattice constant higher than those of the sub-grains.

The self-organized phase may have a lattice constant of 0.408 nm to 0.424 nm.

A first sub-grain may be provided on one side of the self-organized phase and a second sub-grain may be provided on the other side of the self-organized phase, and a crystal orientation direction of the second sub-grain may be tilted at an angle of 1° to 10° with respect to a crystal orientation direction of the first sub-grain.

The self-organized phase may have a band width of approximately 5 to 80 nm.

The non-metal element may include at least one selected from oxygen (O), carbon (C), and nitrogen (N).

A content of the non-metal element in the self-organized phase may be in a range of approximately 0.01 to 10 at %.

The self-organized phase may be composed of the solid solution, and may not contain a compound formed of the aluminum and the non-metal element.

The aluminum-based matrix may be an aluminum alloy.

The aluminum-based matrix may further include an additive element solid-soluble in aluminum, and the additive element may include at least one selected from scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), tungsten (W), silicon (Si), magnesium (Mg), calcium (Ca), strontium (Sr), and beryllium (Be).

A plurality of self-organized phases may be provided in a state in which the plurality of self-organized phases is dispersed in the aluminum-based matrix.

According to an aspect of the present invention, a device to which the above-described composite material including an aluminum-based matrix is applied is provided.

The device may, for example, include an electric vehicle battery case.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
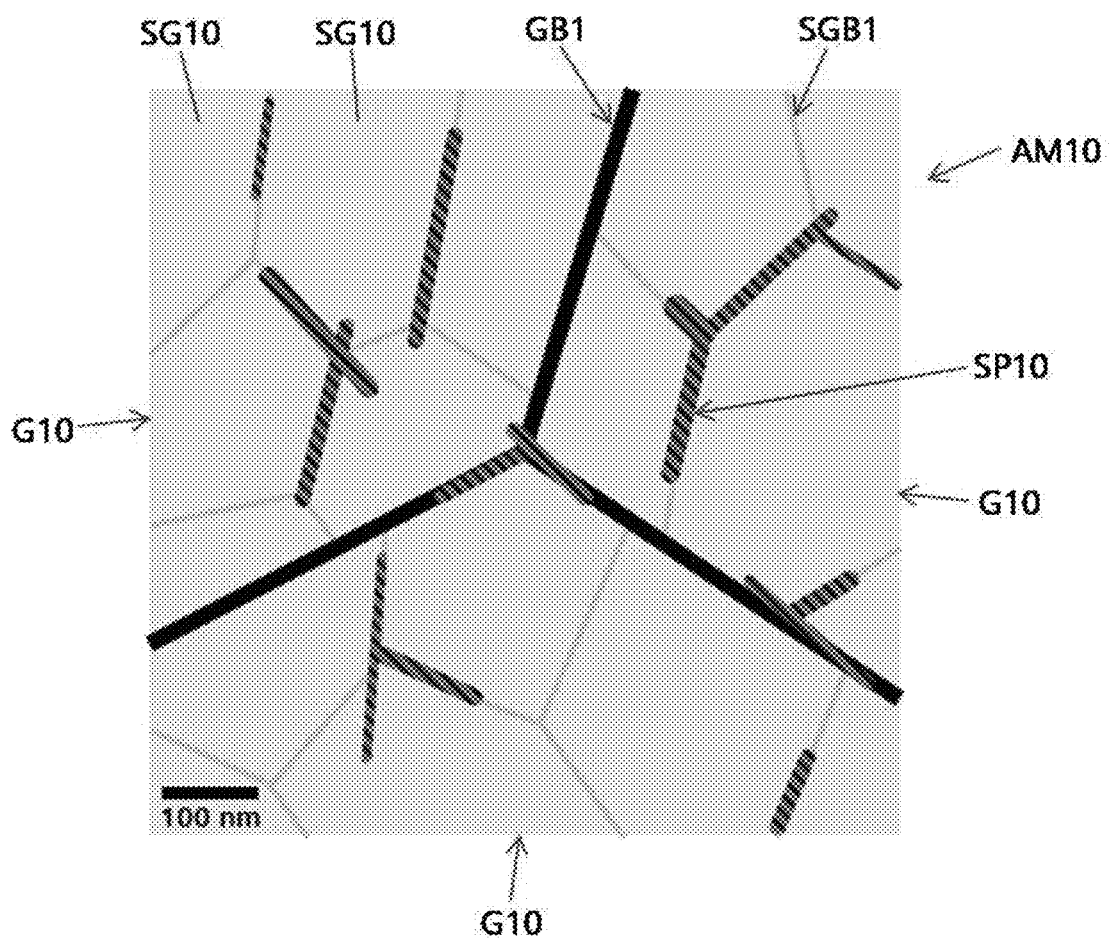
FIG. 1 is an exemplary conceptual diagram for explaining a composite material including an aluminum-based matrix according to one embodiment of the present invention.

Hereinafter, exemplary embodiments of the present invention will be described in detail with reference to the accompanying drawings.

Exemplary embodiments of the present invention provided below are provided to more specifically describe the present invention to those having ordinary skill in the art, and the following exemplary embodiments may be modified in various forms. Therefore, the scope of the present invention is not limited to the following exemplary embodiments.

The terminology used herein is for the purpose of describing particular exemplary embodiments only and is not intended to limit the present invention. As used herein, the singular forms "a," "an," and "the" are intended to include the plural forms as well, unless the context clearly indicates otherwise. Also, it will be further understood that the terms "comprises" and/or "comprising" used herein specify the presence of stated shapes, numbers, steps, operations, members, elements, and/or groups thereof but do not preclude the presence or addition of one or more other shapes, numbers, steps, operations, members, elements, and/or groups thereof. Also, it will be understood that when an element is referred to as being "connected" or "coupled" to another element, it can be directly connected or coupled to the other element or intervening elements may be present. Further, when it is said that a first part is located "on" a second part, this includes not only a case in which the first part is "directly on" the second part but also a case in which a third part is present therebetween. Throughout the specification, the term "and/or" used herein includes any and all combinations of one or more of the associated listed items. In addition, the terms "approximately," "substantially," the like used throughout the specification of the present invention are used at, or in close proximity to, numerical values when manufacturing and material tolerances inherent in the indicated meanings are intended to aid in understanding the present invention. Accurate or absolute figures are used to assist in the prevention of unfair use by unscrupulous infringers.

Throughout the specification, the term "substantially coherent interface" means that a coherent interface is formed between dislocations because the dislocations are spaced apart 20 or more atoms from each other along a crystal interface therebetween.

Hereinafter, exemplary embodiments of the present invention will be described in detail with reference to the accompanying drawings. The sizes or thicknesses of regions or parts shown in the accompanying drawings may be somewhat exaggerated for the purpose of clarity of the specification and convenience of description. Like reference numerals designate like elements throughout the detailed description of the present invention.

FIG. 1 is an exemplary conceptual diagram for explaining a composite material including an aluminum-based matrix according to one embodiment of the present invention.

Referring to FIG. 1, a composite material (hereinafter referred to as a "composite material") including an aluminum-based matrix according to this embodiment may include an aluminum-based matrix AM10 including a plurality of grains G10, wherein each of the grains G10 has a plurality of sub-grains SG10. A grain boundary GB1 may be provided between the plurality of grains G10, and a sub-grain boundary SGB1 may be provided between the plurality of sub-grains SG10. A size (a width) of each of the grains G10 may, for example, be in a range of approximately 30 to 40 μm, and a size (a width) of each of the sub-grains SG10 may, for example, be in a range of approximately 400 to 500 nm. However, the size ranges of the grains G10 and the sub-grains SG10 are given for the purpose of illustration and may vary.

The composite material may include a self-organized phase SP10 disposed at the sub-grain boundary SGB1. The self-organized phase SP10 may include a solid solution composed of aluminum and a non-metal element. Here, the non-metal element may include at least one selected from oxygen (O), carbon (C), and nitrogen (N), and the non-metal element in the composite material may be concentrated and localized in the self-organized phase SP10. The solid solution, that is, a solid solution of the aluminum and the non-metal element may not be present in regions other than the self-organized phase SP10. Because the self-organized phase SP10 has a configuration physically different from the other region of the aluminum-based matrix AM10, a type of material (i.e., the composite material) in which the self-organized phase SP10 is provided in the aluminum-based matrix AM10 may be referred to as a "composite material."

The self-organized phase SP10 may have a band structure. The band structure of the self-organized phase SP10 may be a type of rod structure or a structure similar to the rod structure. The self-organized phase SP10 may have a shape in which a plurality of band structures (or rod structures) are connected to each other. The self-organized phase SP10 itself present at the sub-grain boundary SGB1 may serve as a "sub-grain boundary." The self-organized phase SP10 may be present at the sub-grain boundary having a width significantly broader than general sub-grain boundaries, that is, a sub-grain boundary having a broad width. The self-organized phase SP10 may, for example, have a band width (an average band width) of approximately 5 to 80 nm or a band width (an average band width) of approximately 20 to 65 nm.

The plurality of self-organized phases SP10 may be provided in a state in which the plurality of self-organized phases SP10 are dispersed in the aluminum-based matrix AM10. The plurality of self-organized phases SP10 may be relatively uniformly dispersed and disposed. At least a portion of the self-organized phase SP10 may be positioned on the grain boundary GB1. According to one embodiment, the self-organized phase SP10 may be present in a partial region of the grain boundary GB1. However, the self-organized phase SP10 may be mainly present at the sub-grain boundary SGB1 rather than the grain boundary GB1.

The self-organized phase SP10 coming into contact with the sub-grains SG10 may form a substantially coherent interface. The coherent interface will be described later in further detail with reference to FIG. 7. A plurality of dislocations (not shown) having a predetermined density may be provided along the coherent interface. Also, the dislocations will be described later in further detail with reference to FIG. 7.

Here, the reason why the coherent interface becomes a substantially coherent interface is that a deviation in lattice constant between the self-organized phase SP10 and the sub-grains SG10 is significantly small, i.e., within 1% to 5%. Realistically, it is difficult for the deviation in lattice constant to be less than 1% in consideration of the size of the non-metal element. When the deviation in lattice constant is greater than 5%, the coherent interface does not become a substantially coherent interface, and dislocations frequently occur.

The self-organized phase SP10 may have a lattice constant higher than the lattice constant of the sub-grains SG10 coming into contact with the self-organized phase SP10. The sub-grains SG10 may have a crystalline structure, and the self-organized phase SP10 may also have a crystalline structure. In this case, the lattice constant of the self-organized phase SP10 may be higher than the lattice constant of the sub-grains SG10 corresponding to the self-organized phase SP10. For example, because the self-organized phase SP10 has a solid solution structure in which the non-metal element is interstitially inserted (interstitial solid solution) in a crystal structure composed of aluminum (an aluminum element), the self-organized phase SP10 may have a higher lattice constant higher than the sub-grains SG10 in a first direction due to the presence of the non-metal element. As a specific example, the lattice constant of the self-organized phase SP10 may be in a range of 0.408 nm to 0.424 nm. The sub-grains SG10 do not include the non-metal element, and may be composed of aluminum or an aluminum alloy. Therefore, the self-organized phase SP10 may have a lattice constant higher than the sub-grains SG10 in the first direction. This will be described later in more detail with reference to FIG. 6.

The self-organized phase SP10 may have a lattice constant higher than the sub-grains SG10, but may have a very small difference in lattice constant with respect to the sub-grains SG10. In this case, the difference in lattice constant is in a range of 1% to 5%, as described above. Therefore, the self-organized phase SP10 and the sub-grains SG10 may form a coherent interface in which lattices are substantially (generally) consistent at the junction. In addition, as described above, a plurality of dislocations spaced apart from each other may be provided along the coherent interface.

When the first sub-grain is formed on one side of the self-organized phase SP10 and the second sub-grain is formed on the other side, that is, when the self-organized phase SP10 is provided between the first sub-grain and the second sub-grain, a crystal orientation direction of the second sub-grain may be tilted at an angle of less than approximately 10° or less than approximately 6° with respect to a crystal orientation direction of the first sub-grain. That is, a misorientation angle between the first sub-grain and the second sub-grain may be less than approximately 10° or less than approximately 6°. For example, the misorientation angle may be in a range of approximately 1 to 10° or in a range of approximately 2 to 6°. Therefore, the first sub-grain and the second sub-grain may have the same crystal structure, but the crystal orientation direction of the first sub-grain may be slightly different from that of the second sub-grain. This will be described later in more detail with reference to FIG. 8.

When the tilting angle, that is, a misorientation angle between the first sub-grain and the second sub-grain, is less than 1°, the tilting angle does not have an influence on physical properties as the sub-grain boundary. On the other hand, when the tilting angle is greater than 10°, the coherence of the interface may be degraded.

A content of the non-metal element in the self-organized phase SP10 may be in a range of approximately 0.01 to 10 at %. The self-organized phase SP10 may be composed of the above-described solid solution, that is, a solid solution of the aluminum and the non-metal element. The self-organized phase SP10 does not contain aluminum and a compound formed of the non-metal element and an aluminum base, for example, aluminum oxide, aluminum carbide, or aluminum nitride. In this case, the content of the non-metal element in the composite material should be limited in order to prevent the formation of such compounds. The self-organized phase SP10 may be composed (formed) of the solid solution without containing the compound. In general, when the content of the non-metal element in the self-organized phase SP10 is in a range of approximately 0.01 to 10 at %, it is desirable to form the self-organized phase SP10 as a solid solution without formation of the compound.

The aluminum-based matrix AM10 may be substantially composed of aluminum, or may be substantially composed of an aluminum alloy. Here, the aluminum-based matrix AM10 may refer to a region other than self-organized phase SP10 in the composite material. The aluminum-based matrix AM10 may further include an additive element solid-soluble in aluminum. The additive element may be either a transition metal element or a non-transition metal element, or may be a non-metal element. As a specific example, the additive element may include at least one selected from scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), tungsten (W), silicon (Si), magnesium (Mg), calcium (Ca), strontium (Sr), and beryllium (Be). Here, scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), and tungsten (W) belong to the transition metal element category, magnesium (Mg), calcium (Ca), strontium (Sr), and beryllium (Be) belong to the non-transition metal element category, and silicon (Si) belongs to the non-metal element category. As one preferred example, the additive element may include at least one selected from silicon (Si), magnesium (Mg), and zinc (Zn). The additive element may be a type of alloying element, or may be a type of doping element other than the alloying element. In the composite material, the additive element may be included in an amount at which the additive element is included in a conventional aluminum alloy, or less. Specific types of the above-described additive element are given for the purpose of illustration, and other additive elements may also be used, when necessary.

The composite material according to one embodiment of the present invention may be a cast material, or may be a processed material (e.g., a processed product) manufactured by processing from the cast material. When the composite material is a cast material, a configuration (e.g., a microstructure) of the composite material may be maintained without any substantial change, as described with reference to FIG. 1, even when the cast material is processed using a predetermined processing process (for example, a rolling process or a thermal processing process). Therefore, the processed material (e.g., a processed product) manufactured by processing from the cast material may also have the same configuration as the composite material described with reference to FIG. 1.

The self-organized phase SP10 having a band structure is dispersed in the composite material according to one embodiment of the present invention, and the self-organized phase SP10 may form a substantially coherent interface with the sub-grains SG10 coming into contact with the self-organized phase SP10. Also, a plurality of dislocations spaced apart from each other may be formed along the coherent interface. In this regard, the self-organized phase SP10 may serve as a supply source for dislocations during deformation of the composite material, which results in a remarkably improved elongation of composite material. Also, the self-organized phase SP10 may serve to hinder/suppress the movement (sliding) of dislocations in the matrix during the deformation of the composite material, which results in improved mechanical properties (such as strength and the like) of the composite material.

Figure 2:
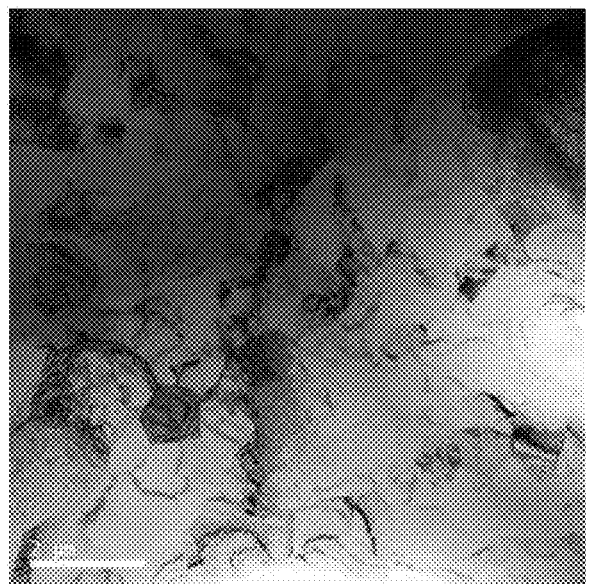
FIGS. 2 and 3 are transmission electron microscope (TEM) images showing composite materials including an aluminum-based matrix manufactured according to embodiments of the present invention.
Figure 3:
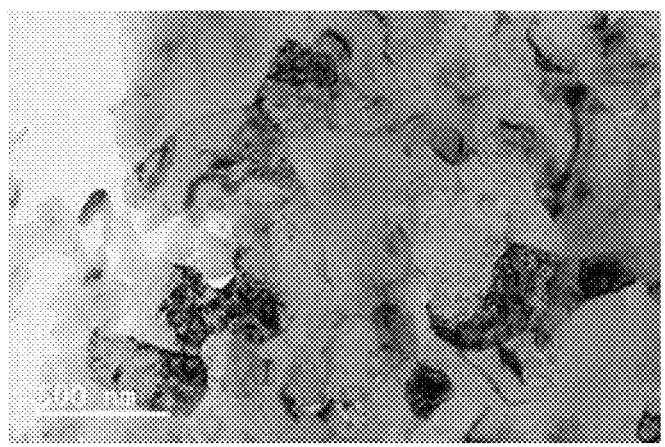

FIGS. 2 and 3 are transmission electron microscope (TEM) images showing composite materials including an aluminum-based matrix manufactured according to embodiments of the present invention.

FIG. 2 shows a composite material cast by adding 1.0% by weight of a ZnO nanopowder to an aluminum molten metal and solidifying the molten metal. In this case, the ZnO nanopowder may be dispersed in the aluminum molten metal to form a plurality of bands. Also, Zn may escape into the aluminum molten metal from the ZnO nanopowder aggregate having a band structure and form a solid solution in aluminum, and oxygen (O) which is a non-metal element may be maintained in an original band structure (located in an original band structure) without escaping from the aggregate. An aluminum element of the aluminum molten metal may permeate into sites from which Zn has escaped in the band structure, and may form a solid solution with oxygen (O) in the band structure. In this way, a solid solution of aluminum and the non-metal element (i.e., oxygen (O)) may be formed. It may be said that the solid solution is formed in a self-organizing manner. The solid solution may correspond to the self-organized phase SP10 described with reference to FIG. 1. Meanwhile, because a very small amount of Zn may form a solid solution in aluminum after escaping into the aluminum molten metal from the ZnO nanopowder aggregate having a band structure, and may be uniformly dispersed in the aluminum molten metal, Zn may hardly affect the crystal structure of the aluminum-based matrix.

Referring to FIG. 3, a composite material cast by adding 1.0% by weight of a SiC nanopowder to the aluminum molten metal and solidifying the molten metal is provided. In this case, the SiC nanopowder may be dispersed in the aluminum molten metal to form a plurality of bands. Also, Si may escape into the aluminum molten metal from the SiC nanopowder aggregate having a band structure and form a solid solution in aluminum, and carbon (C) which is a non-metal element may be maintained in an original band structure (located in an original band structure) without escaping from the aggregate. An aluminum element of the aluminum molten metal may permeate into sites from which Si has escaped in the band structure, and may form a solid solution with carbon (C) in the band structure. In this way, a solid solution of aluminum and the non-metal element (i.e., carbon (C)) may be formed. The solid solution may correspond to the self-organized phase SP10 shown in FIG. 1. Meanwhile, because a very small amount of Si may form a solid solution in aluminum after escaping into the aluminum molten metal from the SiC nanopowder aggregate having a band structure, and may be uniformly dispersed in the aluminum molten metal, Si may hardly affect the crystal structure of the aluminum-based matrix.

Referring to FIGS. 2 and 3, it can be seen that sub-grains having a size (a width) of approximately 700 nm are formed. The self-organized phase described with reference to FIG. 1 is provided between such sub-grains.

Figure 4:
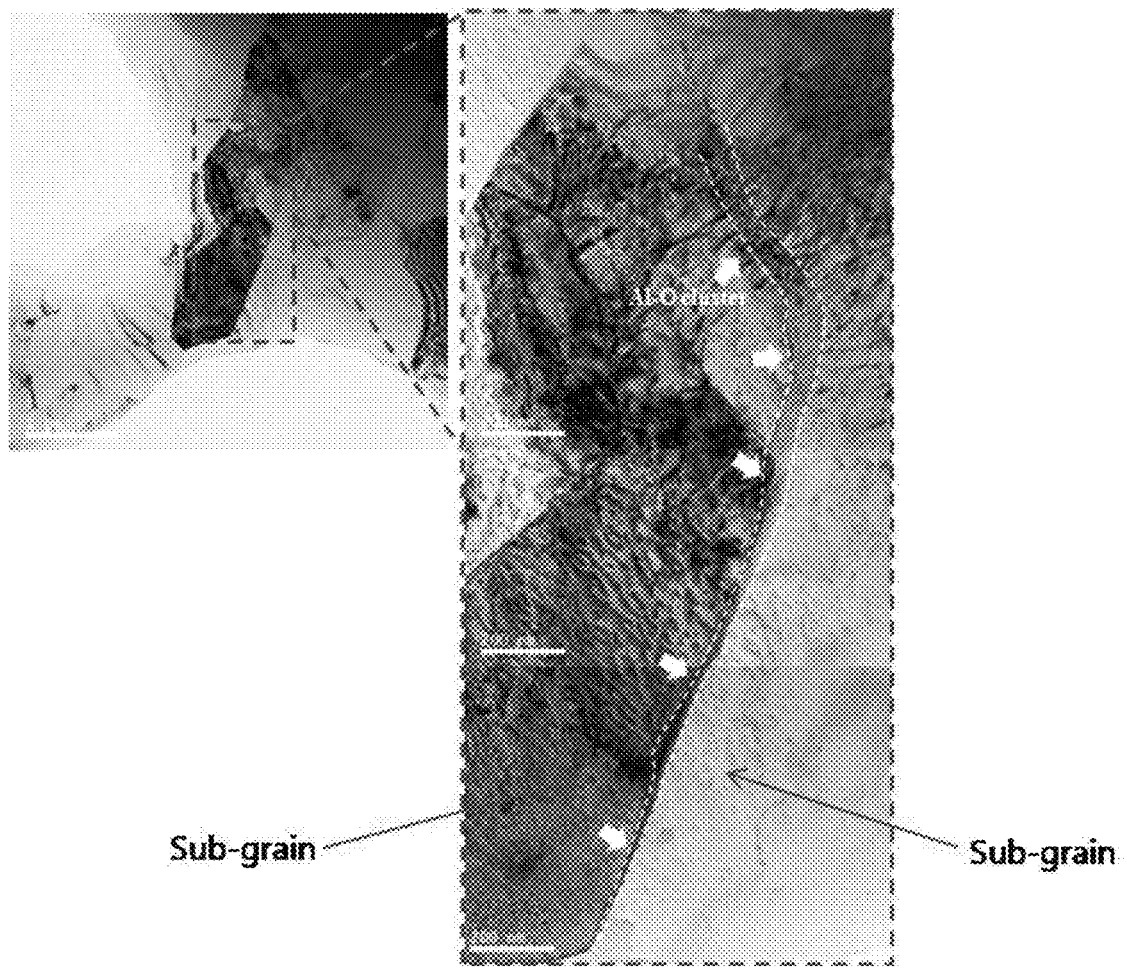
FIG. 4 is an enlarged transmission electron microscope (TEM) image showing a partial region of the composite material shown in FIG. 2.

FIG. 4 is an enlarged transmission electron microscope (TEM) image showing a partial region of the composite material shown in FIG. 2.

Referring to FIG. 4, it can be seen that a self-organized phase indicated as "Al—O cluster" is formed between the sub-grains. The self-organized phase may have a type of band structure. The self-organized phase may have a band width (an average band width) of approximately 5 to 80 nm, and may also have a length of approximately several micrometers (μm) (approximately 1 to 10 μm).

Figure 5:
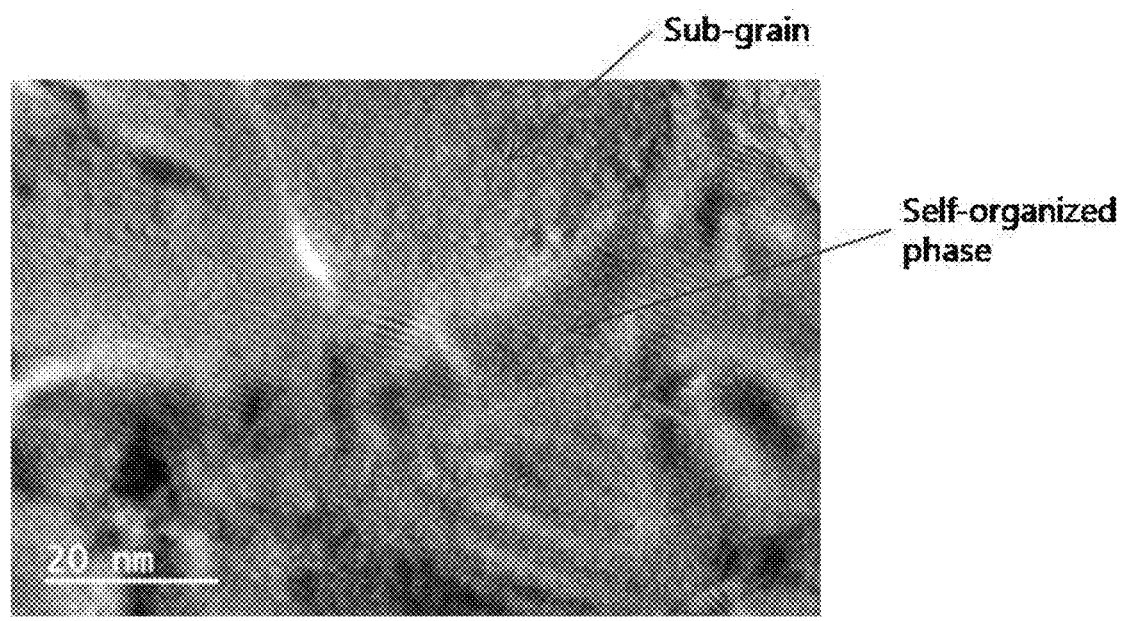
FIG. 5 is an enlarged transmission electron microscope (TEM) image showing a partial region of the composite material shown in FIG. 3.

FIG. 5 is an enlarged transmission electron microscope (TEM) image showing a partial region of the composite material shown in FIG. 3.

Referring to FIG. 5, it can be seen that the self-organized phase having a band structure, which is composed of an Al—C solid solution, is dispersed to form an interface (i.e., a coherent interface) with the sub-grains.

Figure 6:
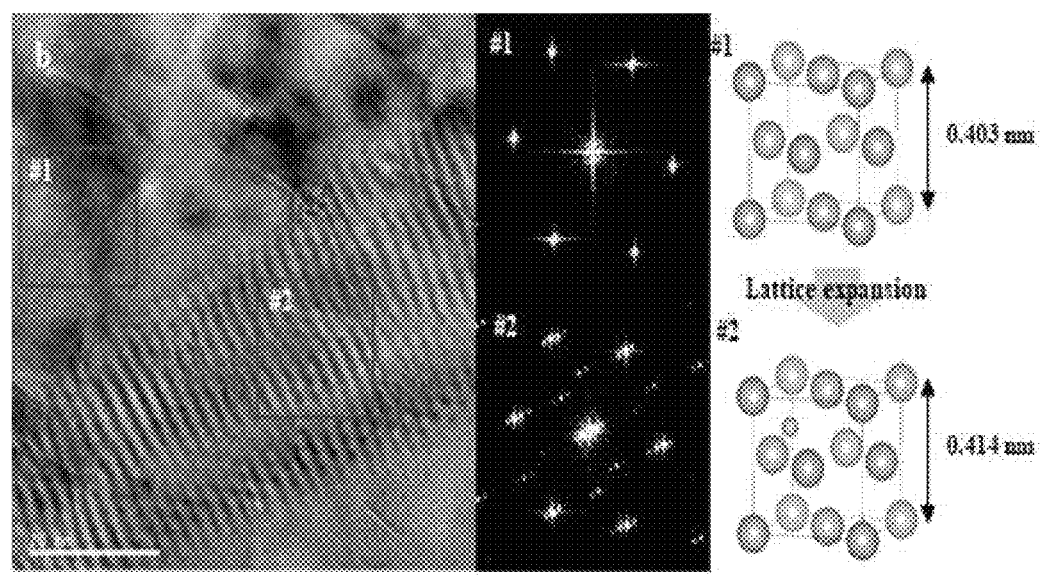
FIG. 6 is an enlarged transmission electron microscope (TEM) image showing a partial region of the composite material shown in FIG. 2.

FIG. 6 is an enlarged transmission electron microscope (TEM) image showing a partial region of the composite material shown in FIG. 2. FIG. 6 shows the results of analyzing selected area electron diffraction (SAED) patterns of a sub-grain region (#1) and a self-organized phase region (#2) coming into contact with the sub-grain region.

Referring to FIG. 6, the sub-grain region (#1) may be substantially composed of aluminum, and the self-organized phase region (#2) may be substantially composed of an Al—O solid solution. In this case, a band width of the self-organized phase is approximately 37 nm. A concentration of oxygen (O) in the self-organized phase is approximately 1.5 at %. As a result of analyzing the SAED patterns of the sub-grain region (#1) and the self-organized phase region (#2), it was confirmed that a lattice constant of aluminum crystals in the sub-grain region (#1) increases by approximately 3% from 0.403 nm to 0.414 nm because oxygen (O) atoms are interstitially located in the lattice in the self-organized phase region (#2). Here, the lattice constant may refer to a lattice constant in a direction (that is, a c-axis direction) perpendicular to the (001) plane. The self-organized phase may have the same face-centered cubic structure as the aluminum-based matrix, and may have a slight difference in lattice constant from the aluminum-based matrix.

Figure 7:
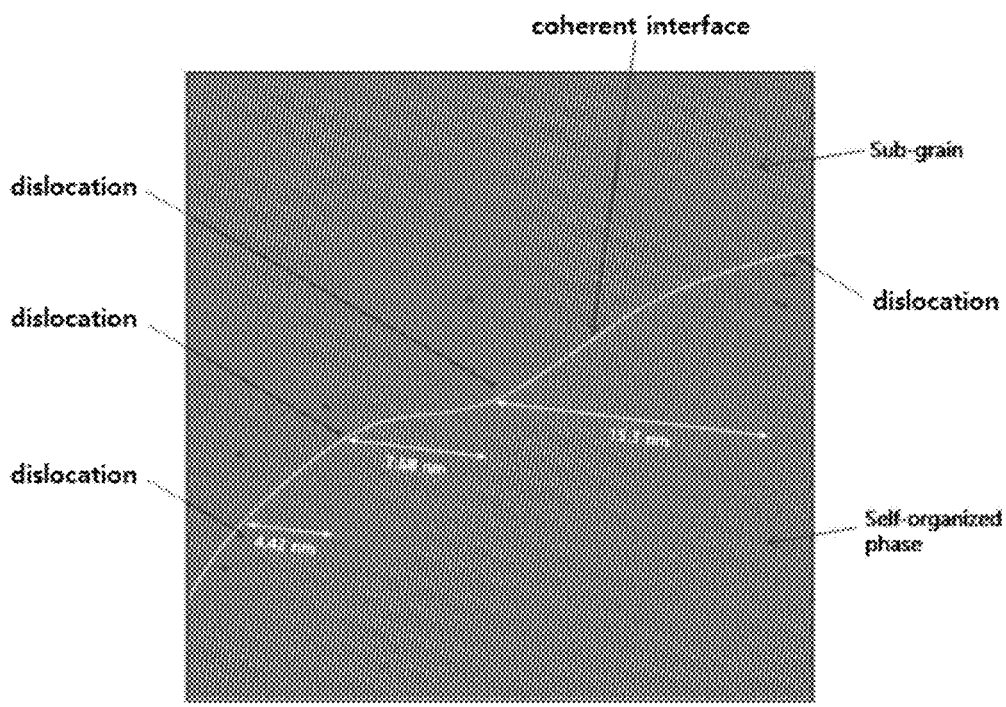
FIG. 7 is an analysis image for analyzing an interfacial region between a sub-grain and a self-organized phase on the (111) plane in the transmission electron microscope (TEM) image shown in FIG. 6 using an inverse fast Fourier transform (I-FFT) method.

FIG. 7 is an analysis image for analyzing an interfacial region between a sub-grain (a matrix) and a self-organized phase (a band) on the (111) plane in the transmission electron microscope (TEM) image shown in FIG. 6 using an inverse fast Fourier transform (I-FFT) method.

Referring to FIG. 7, it can be seen that the sub-grain (a matrix) and the self-organized phase (a band) form a coherent interface in which crystal lattices are substantially consistent with each other. That is, it can be seen that the (111) planes indicated by a white line in a sub-grain (matrix) region and the (111) planes indicated by a white line in a self-organized phase (band) region are aligned so that they are substantially (generally) consistent with each other.

Also, it can be seen that a plurality of dislocations spaced apart from each other are formed along the coherent interface. In addition, it can be seen that the crystal lattices of the self-organized phase are substantially consistent with those of the sub-grains at the coherent interface, but the dislocations appear one-by-one at certain intervals. Because the lattice constant of the self-organized phase slightly differs (for example, by approximately 3%) from the lattice constant of the sub-grains, it is judged that the self-organized phase and the sub-grains generally form a coherent interface with each other, and also include dislocations for compensating for a difference in lattice constant therebetween.

In the image shown in FIG. 7, each of distances indicated by white arrows represents a distance between two adjacent dislocations. The distance is a straight distance in a direction perpendicular to the (111) plane. It is confirmed that the dislocations are present at intervals of approximately 40 atoms on average. An average internal distance between the dislocations (i.e., an average inter-distance between misfit dislocations) is approximately 9.13 nm.

The self-organized phase having a band structure may be formed in the composite material according to one embodiment of the present invention, and the self-organized phase may form a substantially coherent interface with the sub-grains coming into contact with the self-organized phase. Also, a plurality of dislocations spaced apart from each other may be formed along the coherent interface. In this regard, the self-organized phase may serve as a supply source for dislocations during deformation of the composite material, which results in a remarkably improved elongation of composite material. Also, the self-organized phase may also serve to hinder/suppress the movement (sliding) of dislocations in the matrix during the deformation of the composite material, which results in improved mechanical properties (such as strength and the like) of the composite material.

Figure 8:
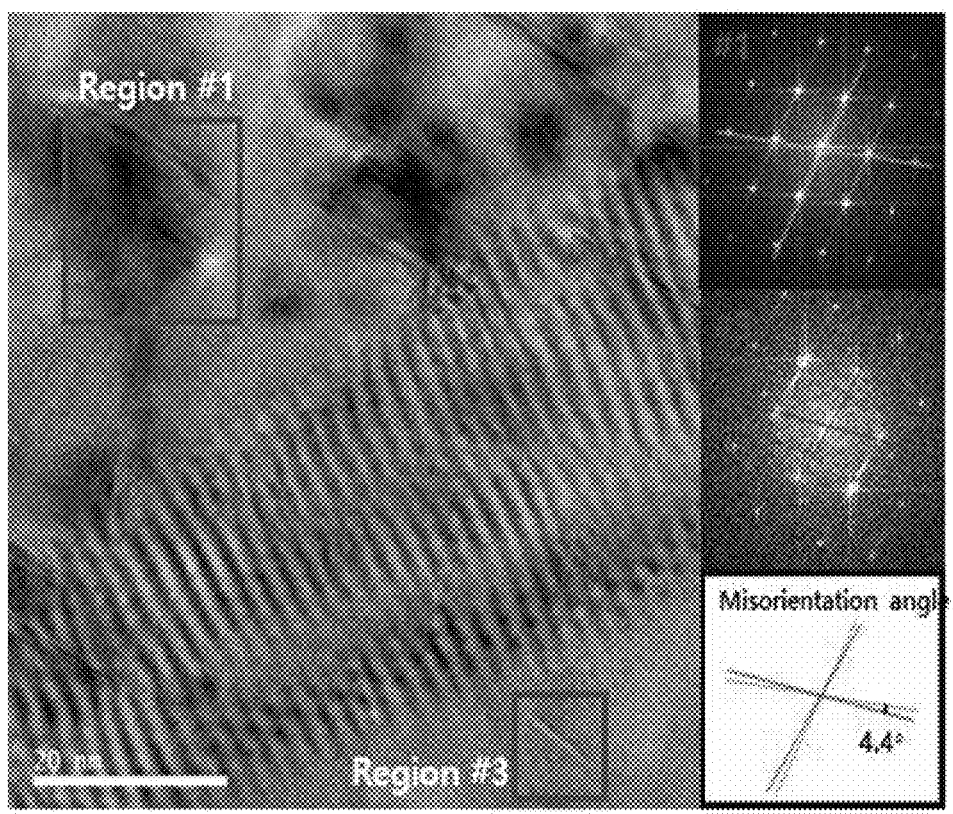
FIG. 8 is a transmission electron microscope (TEM) image showing the composite material according to one embodiment corresponding to that of FIG. 6, that is, a diagram showing the results of analyzing a difference in crystal orientation direction between the sub-grains (#1 and #3) present at both sides of the self-organized phase.

FIG. 8 is a transmission electron microscope (TEM) image showing the composite material according to one embodiment corresponding to that of FIG. 6, that is, a diagram showing the results of analyzing a difference in crystal orientation direction between the sub-grains (#1 and #3) present at both sides of the self-organized phase (a band).

Referring to FIG. 8, it can be seen that, when the results of analysis of crystal lattices in the #1 region corresponding to the first sub-grain region at one side of the self-organized phase (a band) are compared with the results of analysis of crystal lattices in the #3 region corresponding to the second sub-grain region at the other side of the self-organized phase (a band), the crystal orientation direction of the second sub-grain is tilted at an angle of approximately 4.4° with respect to the crystal orientation direction of the first sub-grain. That is, the misorientation angle between the first sub-grain and the second sub-grain is approximately 4.4°. This indicates that a face angle between the aluminum matrixes (#1 and #3) of the two regions slightly differs by approximately 4.4° on the basis of the self-organized phase (a band). In this case, a width of the self-organized phase (a band) is approximately 37 nm.

Figure 9:
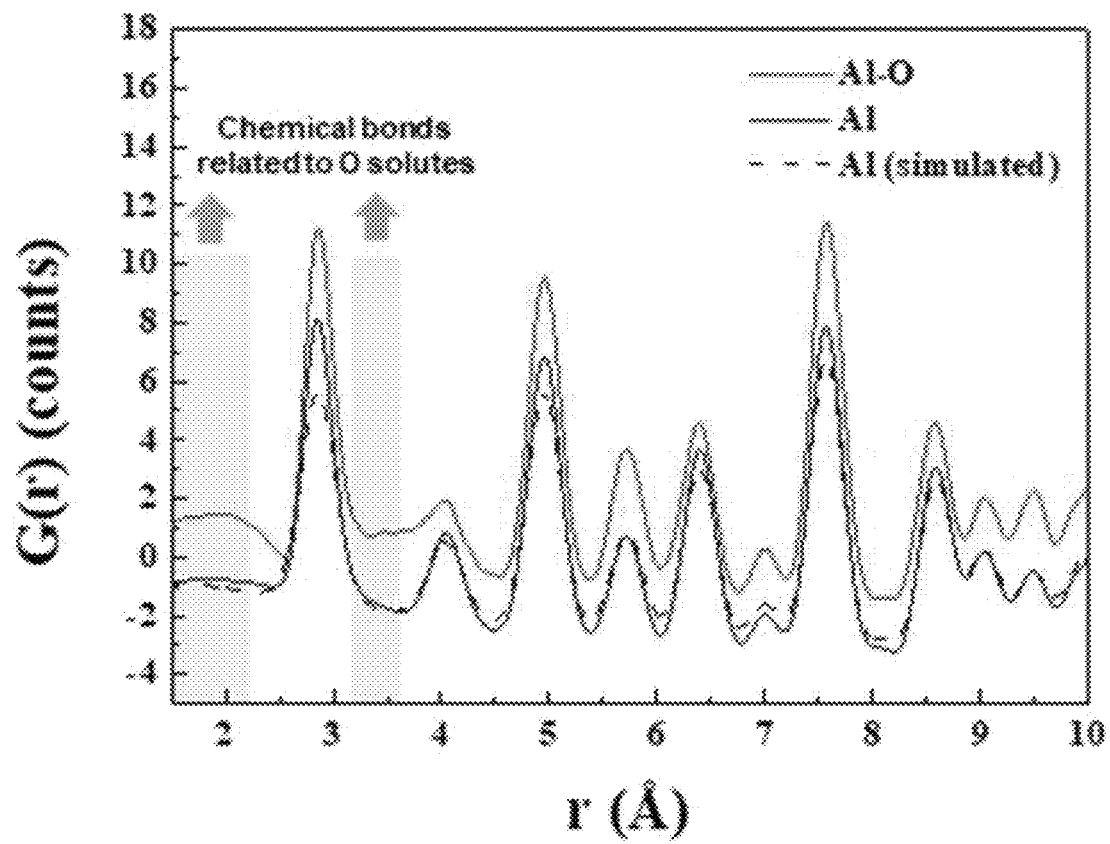
FIG. 9 shows the results of neutron scattering analysis of the composite material including an aluminum-based matrix according to one embodiment of the present invention.

FIG. 9 shows the results of neutron scattering analysis (atomic pair distribution function) of the composite material including an aluminum-based matrix according to one embodiment of the present invention. The composite material shown in FIG. 9 corresponds to a composite material cast by adding 2.0% by weight of a ZnO nanopowder to an aluminum molten metal and solidifying the molten metal. In the similar manner as described with reference to FIG. 2, a solid solution of aluminum and oxygen (O), which is a non-metal element, may be formed in a self-organizing manner. In this case, the solid solution may correspond to the self-organized phase SP10 shown in FIG. 1. A line indicated by "Al—O" in the graph shown in FIG. 9 corresponds to the composite material according to one embodiment. FIG. 9 shows the results of measurement and simulation of aluminum (Al), which is used for comparison with the composite material according to one embodiment.

Referring to FIG. 9, it can be seen from the results of measurement of the composite material according to one embodiment that there are bonds corresponding to the bond lengths between aluminum atoms and interstitially located non-metal atoms (i.e., oxygen) in the aluminum in regions indicated in green. This indicates that the solid solution (a self-organized phase) between the aluminum and the non-metal atoms (i.e., oxygen) is formed in the composite material according to one embodiment.

Figure 10:
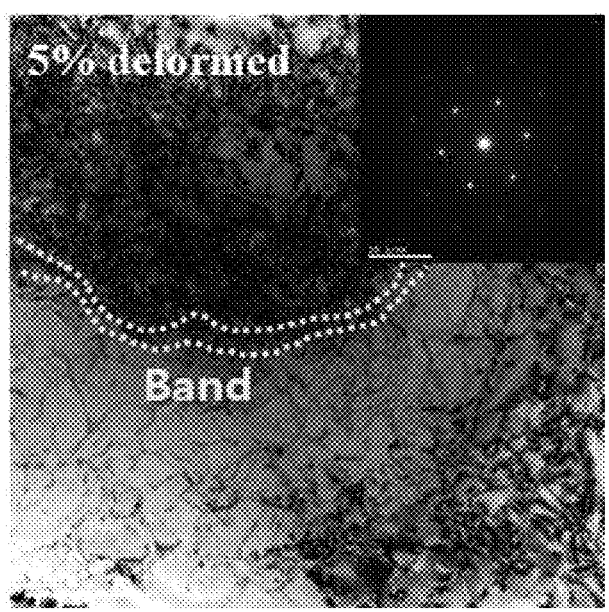
FIG. 10 is a transmission electron microscope (TEM) image showing a microstructure of the composite material according to one embodiment of the present invention when the composite material is deformed by strain.

FIG. 10 is a transmission electron microscope (TEM) image showing a microstructure of the composite material according to one embodiment of the present invention when the composite material is deformed by strain.

Referring to FIG. 10, the self-organized phase having a band structure may interact with the dislocations in a predetermined manner during the deformation (5% deformation by strain) of the composite material according to one embodiment. The self-organized phase (i.e., a band cell) composed of a band structure may serve to hinder/suppress the sliding (movement) of dislocations during the deformation of the composite material. Also, a self-organized phase (i.e., a band cell) composed of a band structure may serve as a source and sink for the existing dislocations. A remarkable increase in elongation of the composite material may be caused and strength characteristics may be improved due to such a role of the self-organized phase.

Figure 11:
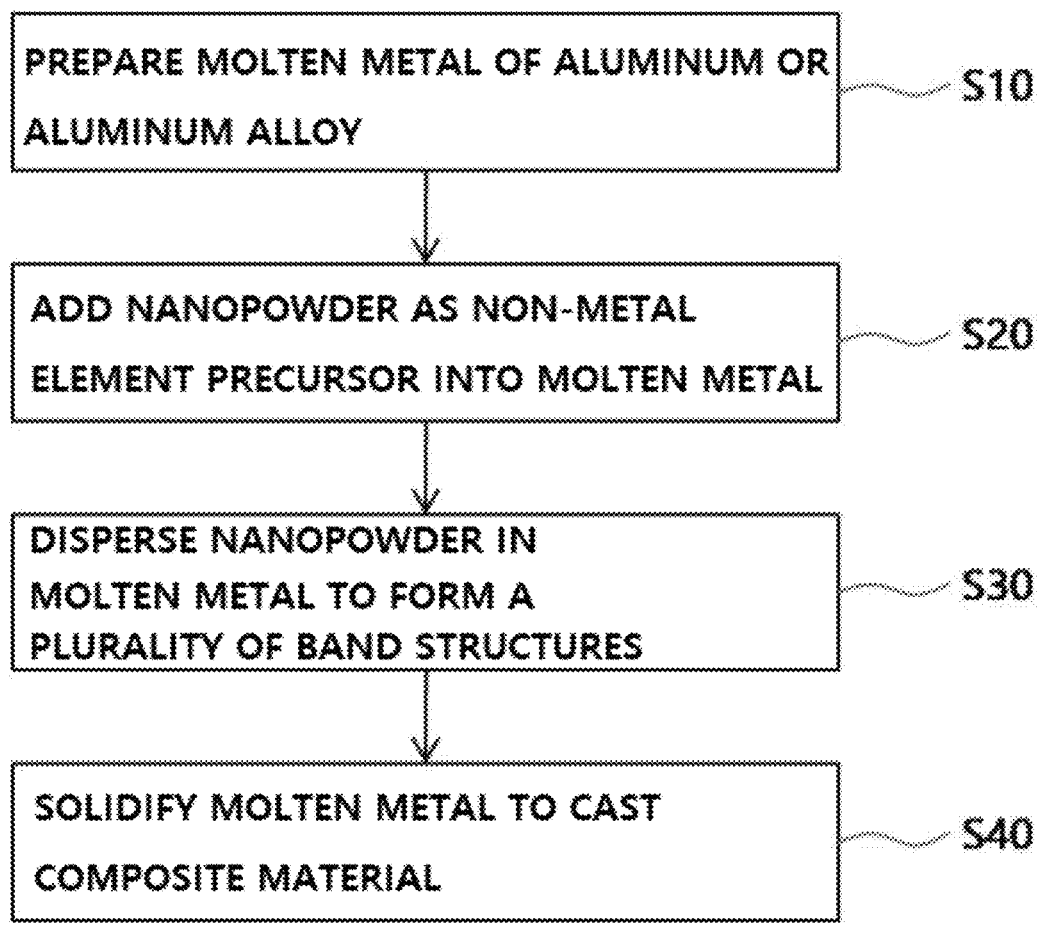
FIG. 11 is a flowchart for explaining a method of manufacturing a composite material including an aluminum-based matrix according to one embodiment of the present invention.

FIG. 11 is a flowchart for explaining a method of manufacturing a composite material including an aluminum-based matrix according to one embodiment of the present invention.

Referring to FIG. 11, the method of manufacturing a composite material including an aluminum-based matrix according to this embodiment may include: (S10) preparing a molten metal of aluminum or an aluminum alloy, (S20) adding a nanopowder as a non-metal element precursor into the molten metal, (S30) dispersing the nanopowder in the molten metal to form a plurality of band structures, and (S40) solidifying the molten metal to cast a composite material.

In Step S10, a heating temperature of the molten metal may, for example, be in a range of 650 to 850° C., and may vary without any limitation. When the aluminum alloy is used in Step S10, the aluminum alloy may include an additive element solid-soluble in aluminum. The additive element may be either a transition metal element or a non-transition metal element, or may be a non-metal element. As a specific example, the additive element may include at least one selected from scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), tungsten (W), silicon (Si), magnesium (Mg), calcium (Ca), strontium (Sr), and beryllium (Be). Here, scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), and tungsten (W) belong to the transition metal element category, magnesium (Mg), calcium (Ca), strontium (Sr), and beryllium (Be) belong to the non-transition metal element category, and silicon (Si) belongs to the non-metal element category. As a preferred example, the additive element may include at least one selected from silicon (Si), magnesium (Mg) and zinc (Zn). Specific types of the above-described additive element are given for the purpose of illustration, and other additive elements may also be used, when necessary.

In Step S20, the nanopowder which is a non-metal element precursor may be added into the molten metal. The non-metal element may include at least one selected from oxygen (O), carbon (C), and nitrogen (N). The nanopowder may be a powder of a compound including the non-metal element. The nanopowder may be a ceramic nanopowder. As a specific example, the nanopowder may include at least one selected from zinc oxide (ZnO), titanium oxide ($TiO_2$), copper oxide ($CuO_2$), iron oxide ($Fe_2O_3$), copper nitride (CuN), iron nitride (FeN), zinc nitride (ZnN), titanium nitride (TiN), and magnesium nitride (MgN). Alternatively, the nanopowder may include at least one selected from aluminum oxide ($Al_2O_3$), aluminum nitride (AlN), magnesium oxide ($MgO_2$), silicon oxide ($SiO_2$), silicon carbide (SiC), silicon nitride ($Si_3N_4$), tungsten oxide (WO), and tungsten nitride (WN). However, specific types of materials for the nanopowder are given for the purpose of illustration and the present invention is not limited thereto. An average particle size of the nanopowder may be in a range of approximately 5 to 100 nm. The nanopowder may be mixed at a content of approximately 0.01% by weight to 5.0% by weight, preferably a content of approximately 0.1% by weight to 4.0% by weight, based on the total weight of the molten metal.

In Step S30, the nanopowder may be dispersed in the molten metal to form a plurality of band structures. The nanopowder may not be uniformly dispersed in the molten metal, but an aggregate (powder aggregate) having a plurality of band structures may be controlled so that the aggregate can be dispersed in the molten metal. For this purpose, a nanopowder having an appropriate cohesive force may be selected in Step S20, and the stirring conditions, the temperature conditions, and the like may be appropriately controlled in Step S30.

In Step S30, the temperature of the molten metal may be greater than or equal to a solidus temperature and less than or equal to 900° C.

Also, the stirring may be performed by introducing a rotor member having a plurality of rotor blades into the molten metal and rotating the rotor member. The plurality of rotor blades may have a structure inclined at a predetermined angle with respect to the rotary shaft of the rotor member.

Preferably, the rotor member may be introduced with a stator member. In this case, the stator member has a cylindrical structure with open top and bottom portions because the stator member has a structure with open top and bottom portions and also has a sidewall portion defining an inner space. The rotor member may be positioned in an inner space of the cylindrical sidewall portion to rotate the rotor member around the cylindrical center serving as the rotary shaft.

Preferably, the rotor member may rotate at a speed of 10 to 1,000 rpm, more preferably a speed of 200 to 700 rpm.

Preferably, the rotor member may also have a first rotor member positioned on an upper portion of the rotary shaft and a second rotor member having a plurality of rotor blades positioned on a lower portion of the rotary shaft. In this case, the first rotor member and the second rotor member may have different structures.

That is, the first rotor member and the second rotor member may have different sizes and different rotor blade shapes. Also, the rotor blade may have a structure in which the rotor blade is inclined at different inclinations with respect to the rotary shaft in the first rotor member and the second rotor member.

In this case, the nanopowder may be dispersed in the molten metal to form a plurality of bands, and the elements such as Zn, Si, and the like escape into the aluminum molten metal from the nanopowder aggregate having a band structure, and form a solid solution in aluminum. The non-metal element (e.g., oxygen, carbon, or nitrogen) may be generally maintained in an original band structure (located in an original band structure) without escaping from the aggregate. An aluminum element of the molten metal may permeate into sites from which Zn, Si, or the like has escaped in the band structure, and may form a solid solution with the non-metal element (e.g., oxygen, carbon, or nitrogen) in the band structure. In this way, a solid solution of aluminum and the non-metal element (e.g., oxygen, carbon, or nitrogen) may be formed. It may be said that the solid solution is formed in a self-organizing manner. The solid solution may correspond to the self-organized phase SP10 described with reference to FIG. 1. Meanwhile, because a very small amount of Zn, Si, or the like may form a solid solution in aluminum after escaping into the aluminum molten metal from the ZnO nanopowder aggregate having a band structure, and may be uniformly dispersed in the aluminum molten metal, Zn, Si, or the like may hardly affect the crystal structure of the aluminum-based matrix.

In Step S40, the molten metal may be solidified to cast a composite material. The solidification of the molten metal may be realized by cooling the molten metal. A subsequent heat treatment or annealing process may be further performed, when necessary. The cast material thus manufactured may correspond to the composite material according to one embodiment described with reference to FIG. 1. Also, even when the cast material is processed using a predetermined processing process (for example, a rolling process or a thermal processing process), a configuration (e.g., a microstructure) of the composite material described with reference to FIG. 1 may be maintained without any substantial change. Therefore, the processed material (e.g., a processed product) manufactured by processing from the cast material may also have the same configuration as the composite material described with reference to FIG. 1.

Figure 12:
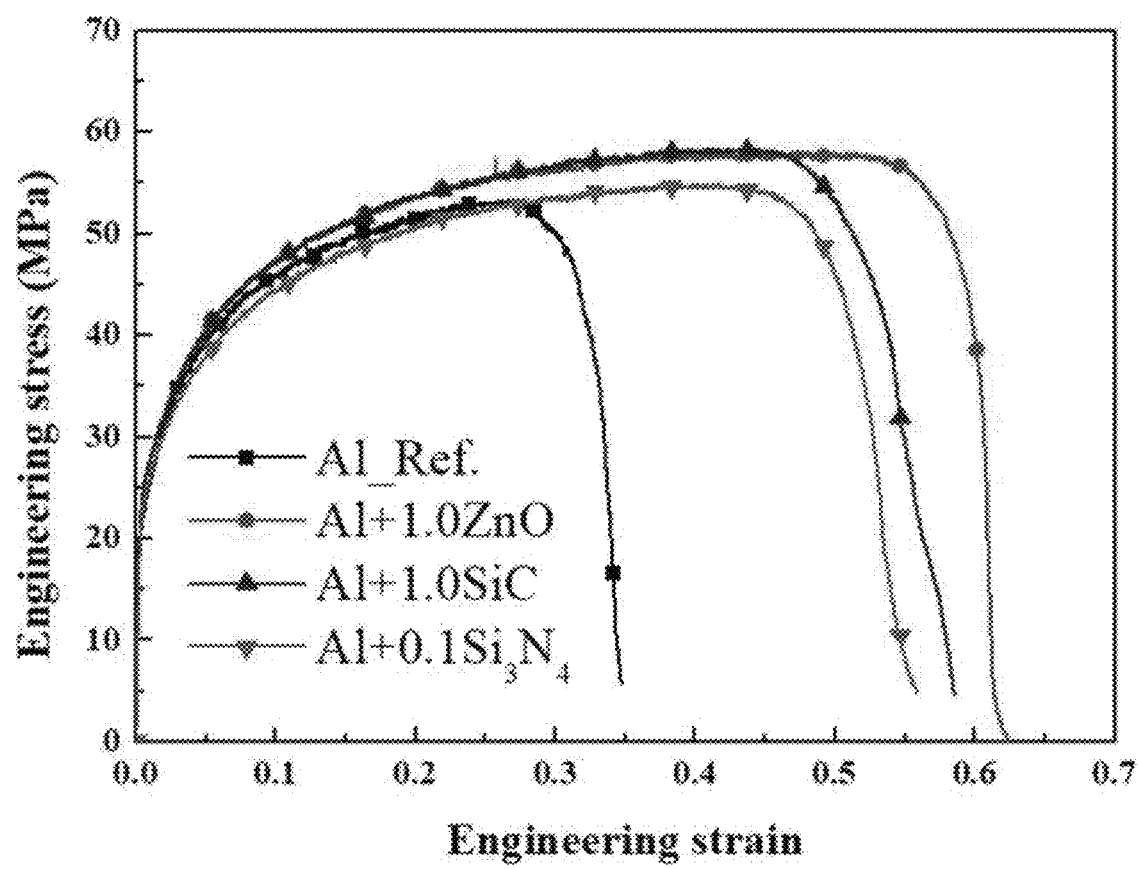
FIG. 12 is a graph showing the tensile test results of the composite materials including an aluminum-based matrix manufactured according to embodiments of the present invention.

FIG. 12 is a graph showing the tensile test results of the composite materials including an aluminum-based matrix manufactured according to embodiments of the present invention. FIG. 12 shows the tensile test results of a composite material manufactured by adding 1.0% by weight of a ZnO nanopowder to an Al molten metal, a composite material manufactured by adding 1.0% by weight of a SiC nanopowder to an Al molten metal, and a composite material manufactured by adding 0.1% by weight of a $Si_3N_4$ nanopowder to an Al molten metal. All the composite materials correspond to the composite material according to one embodiment of the present invention. Also, FIG. 12 shows the tensile test results of an aluminum cast material (i.e., Al_Ref) to which the nanopowder is not added as the control for comparison.

Referring to FIG. 12, it can be seen that the composite materials manufactured according to the embodiments have a remarkably high elongation and superior strength characteristics, compared to the aluminum cast material (i.e., Al_Ref) as the control. This may be due to the effect of the self-organized phase having a band structure, which is formed in each of the composite materials manufactured according to the embodiments.

Figure 13:
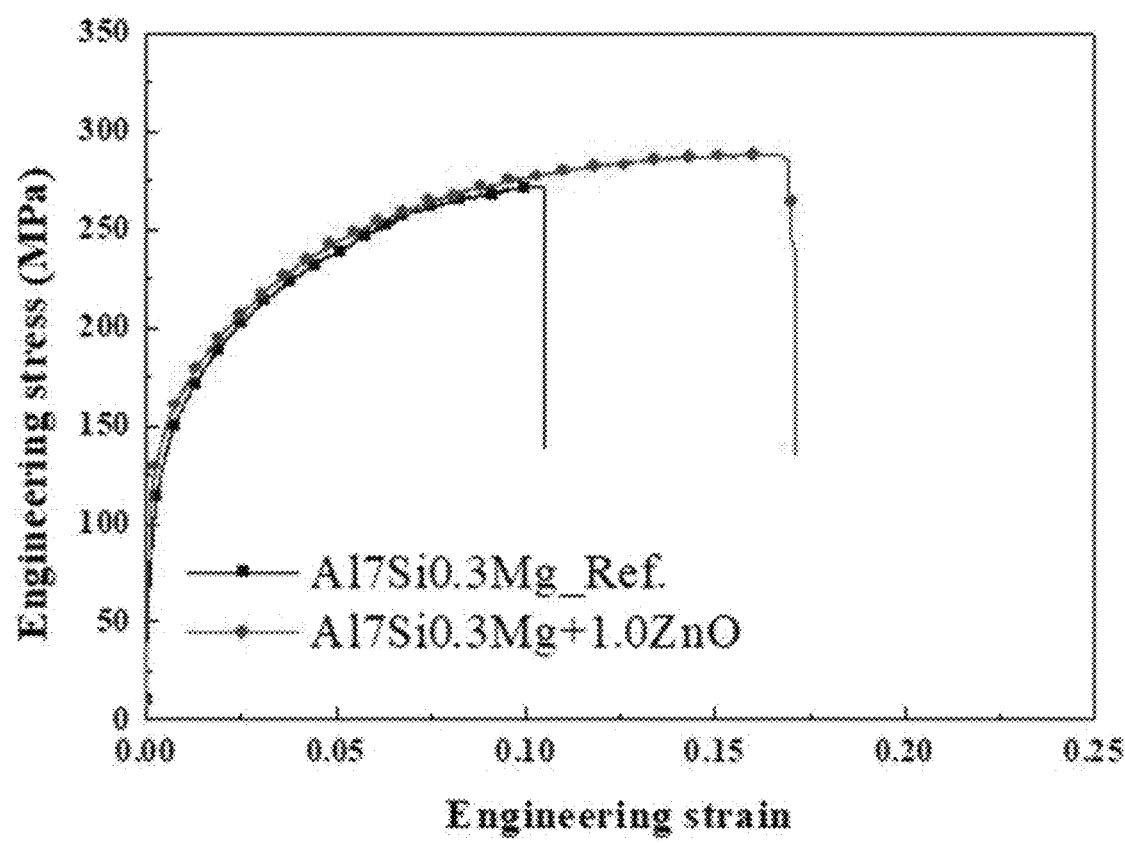
FIG. 13 is a graph showing the tensile test results of the composite materials including an aluminum-based matrix manufactured according to another embodiment of the present invention.

FIG. 13 is a graph showing the tensile test results of the composite materials including an aluminum-based matrix manufactured according to another embodiment of the present invention. FIG. 13 shows the tensile test results of a composite material manufactured by adding 1.0% by weight of a ZnO nanopowder to a molten metal of an Al—Si—Mg alloy according to one embodiment. Here, the Al—Si—Mg alloy may be an alloy in which 7% by weight of Si and 0.3% by weight of Mg are included in an Al matrix. This may correspond to an A356 alloy. The composite material according to one embodiment is manufactured by adding 1.0% by weight of a ZnO nanopowder to a molten metal of such an Al—Si—Mg alloy. Also, FIG. 13 shows the tensile test results of an Al—Si—Mg alloy cast material (i.e., $Al_7Si_{0.3}Mg$_Ref) to which the nanopowder is not added as the control for comparison.

Referring to FIG. 13, it can be seen that the composite material manufactured according to one embodiment has a remarkably high elongation and superior strength characteristics, compared to the Al—Si—Mg alloy cast material (i.e., $Al_7Si_{0.3}Mg$_Ref) as the control. This may be due to the effect of the self-organized phase having a band structure, which is formed in each of the composite materials manufactured according to the embodiments.

Figure 14:
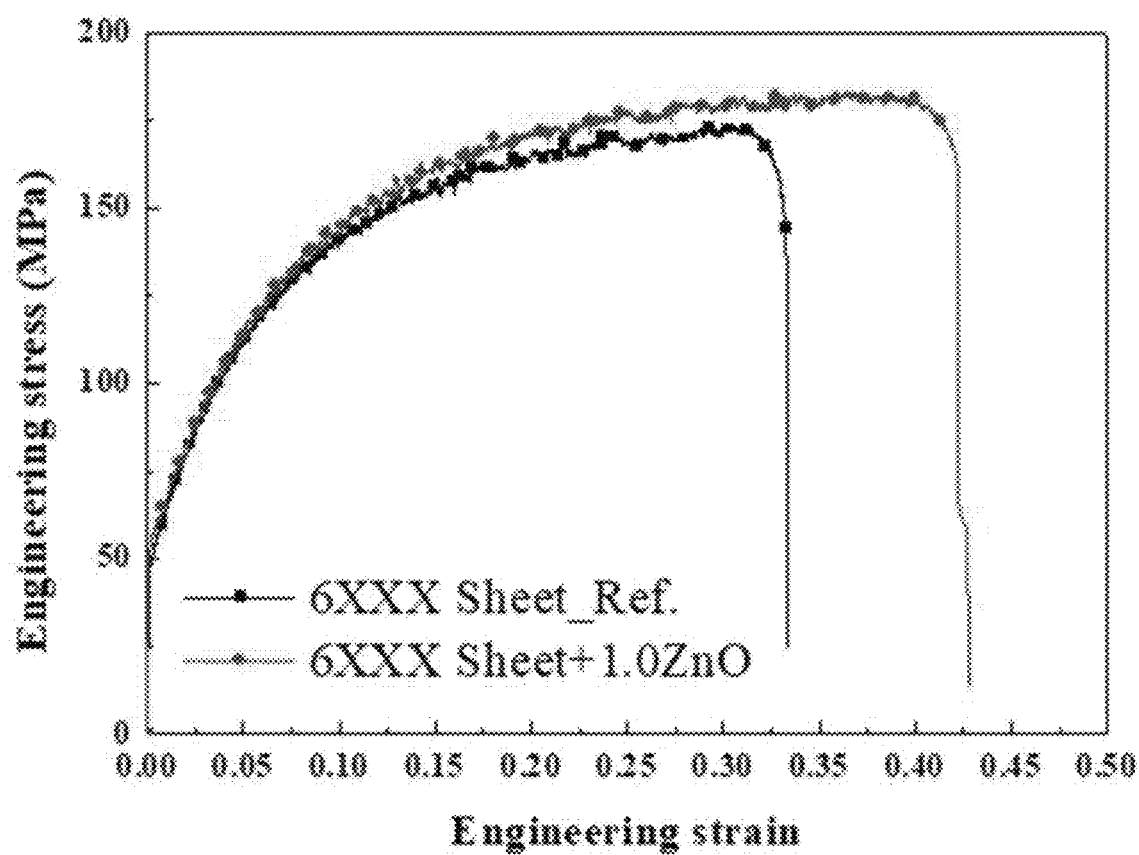
FIG. 14 is a graph showing the tensile test results of the composite materials including an aluminum-based matrix manufactured according to still another embodiment of the present invention.

FIG. 14 is a graph showing the tensile test results of the composite materials including an aluminum-based matrix manufactured according to still another embodiment of the present invention. FIG. 14 shows the tensile test results of a composite material (e.g., a rolled plate) obtained from a cast material manufactured by adding 1.0% by weight of a ZnO nanopowder to a molten metal prepared by melting a 6000-series sheet according to one embodiment. Here, the composite material (e.g., a rolled plate) may be one example of the processed material (e.g., a processed product) processed from the cast material. Also, FIG. 14 shows the tensile test results of a conventional 6000-series sheet (i.e., 6XXX Sheet_Ref) as the control for comparison.

Referring to FIG. 14, it can be seen that the composite material manufactured according to one embodiment has a remarkably high elongation and superior strength characteristics, compared to the 6000-series sheet (i.e., 6XXX Sheet_Ref) as the control. This may be due to the effect of the self-organized phase having a band structure, which is formed in each of the composite materials manufactured according to the embodiments.

In addition, the composite material including an aluminum-based matrix manufactured according to one embodiment of the present invention may have excellent thermal conductivity characteristics. The non-metal element (e.g., oxygen, carbon, or nitrogen) may serve as a superior heat transfer medium in the self-organized phase having a band structure, and may also serve to effectively diffuse heat in the band structure. Therefore, the non-metal element (e.g., oxygen, carbon, or nitrogen) may improve thermal conductivity characteristics in the band structure. Also, because the self-organized phase and the sub-grains coming into contact with the self-organized phase form a coherent interface, the self-organized phase and the sub-grains may effectively transfer heat to the aluminum-based matrix through the coherent interface. Therefore, the overall thermal conductivity characteristics of the composite material according to one embodiment may be improved.

Figure 15:
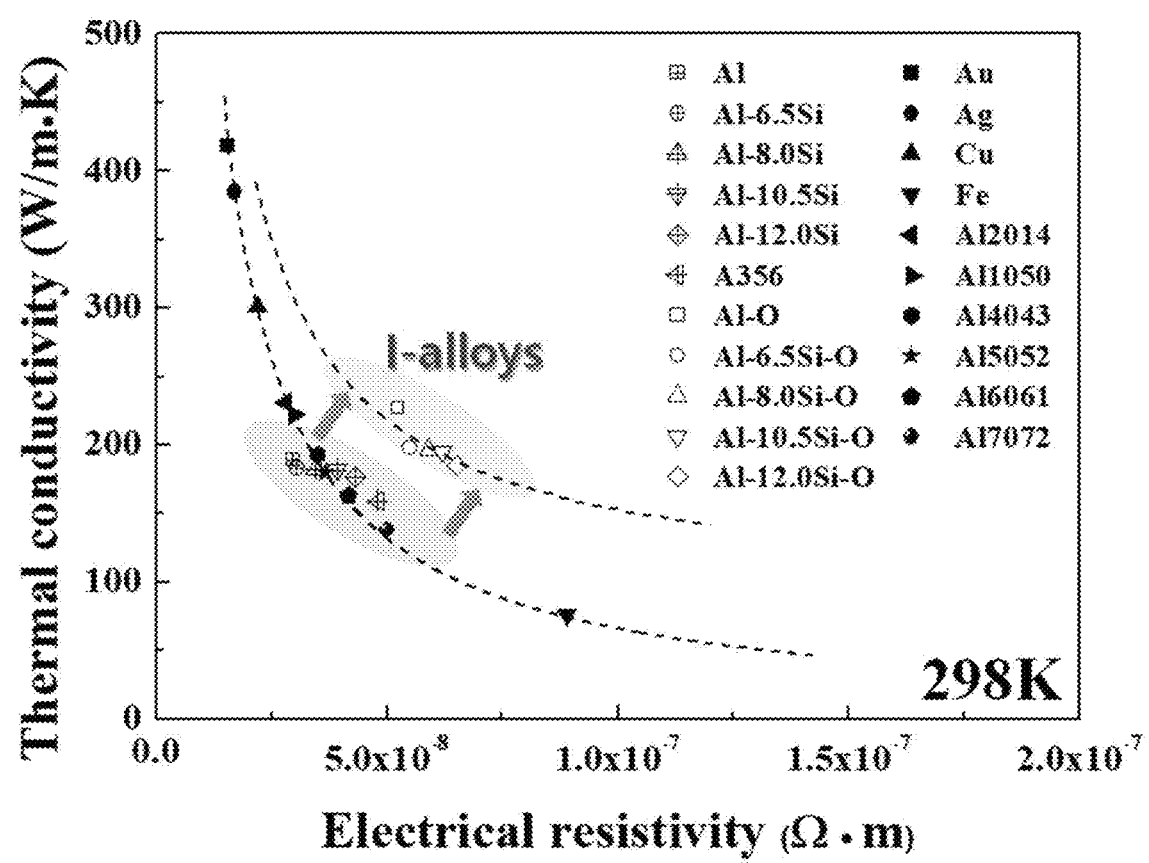
FIG. 15 is a graph showing the results of measuring electrical conductivity vs. thermal conductivity characteristics of the composite material including an aluminum-based matrix, which is manufactured according to one embodiment of the present invention, and a control material for comparison with the composite material.

FIG. 15 is a graph showing the results of measuring electrical conductivity vs. thermal conductivity characteristics of the composite material including an aluminum-based matrix, which is manufactured according to one embodiment of the present invention, and a control material for comparison with the composite material. Materials indicated as "I-alloys" in FIG. 15, that is, materials indicated as Al—O, Al-6.5Si—O, Al-8.0Si—O, Al-10.5Si—O, and Al-12.0Si—O, correspond to the composite material according to one embodiment of the present invention. Each of the materials includes oxygen (O) as the non-metal element in the self-organized phase having a band structure. Meanwhile, as the control for comparison with the composite materials according to the embodiments, materials indicated as Al, Al-6.5Si, Al-8.0Si, Al-10.5Si, Al-12.0Si, and A356 do not include a non-metal element (i.e., oxygen). Also, FIG. 15 shows the data on other various metals.

Referring to FIG. 15, it can be seen that the composite materials according to the embodiments of the present invention have remarkably improved thermal conductivity, compared to that of the control material. This may be due to the effect of heat diffusion through the non-metal element in the self-organized phase having a band structure and the effect of effective heat transfer through the coherent interface between the self-organized phase and the sub-grains, as previously described above.

Figure 16:
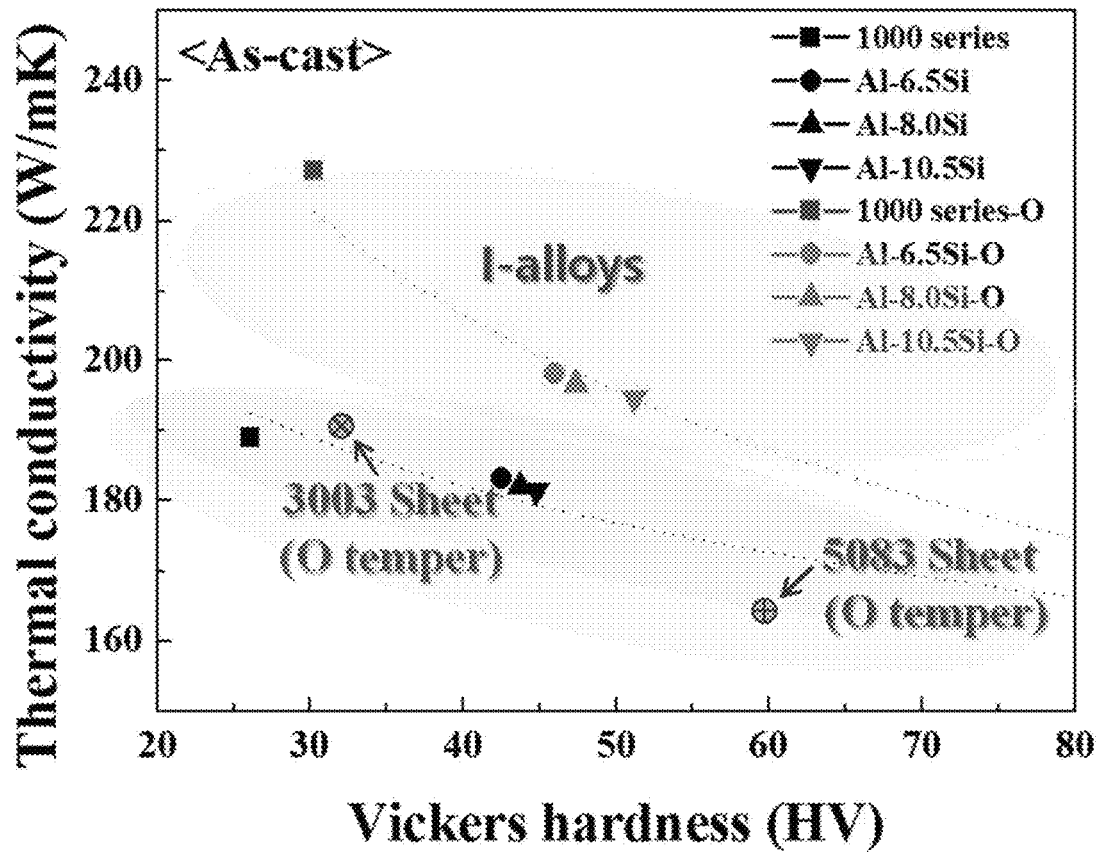
FIG. 16 is a graph showing the results of measuring hardness vs. thermal conductivity characteristics of the composite material including an aluminum-based matrix, which is manufactured according to one embodiment of the present invention, and a control material for comparison with the composite material.

FIG. 16 is a graph showing the results of measuring hardness vs. thermal conductivity characteristics of the composite material including an aluminum-based matrix, which is manufactured according to one embodiment of the present invention, and a control material for comparison with the composite material. Materials indicated as "I-alloys" in FIG. 16, that is, materials indicated as 1000 series-O, Al-6.5Si—O, Al-8.0Si—O, and Al-10.5Si—O, correspond to the composite material according to one embodiment of the present invention. Each of the materials includes oxygen (O) as the non-metal element in the self-organized phase having a band structure. Meanwhile, as the control for comparison with the composite materials according to the embodiments, materials indicated as 1000 series, Al-6.5Si, Al-8.0Si, and Al-10.5Si do not include a non-metal element (i.e., oxygen). Also, FIG. 16 shows the data on 3003 Sheet and 5083 Sheet materials as the other controls.

Referring to FIG. 16, the composite material according to one embodiment of the present invention may have significantly improved thermal conductivity compared to the thermal conductivity of the control material. According one embodiment of the present invention, a composite material having excellent mechanical properties such as hardness and strength and also having remarkably improved thermal conductivity may be obtained. This may be due to the effect of the coherent interface and the self-organized phase having a band structure. FIG. 16 shows the results obtained when the composite material is a cast material, but the processed material processed from the cast material may also have the same effect.

The composite material according to one embodiment of the present invention may be effectively applied to various fields because the composite material may have excellent mechanical properties and may also exhibit excellent thermal conductivity characteristics. As one example, the composite material according to one embodiment of the present invention may be applied as a material for an electric vehicle battery case. In this case, excellent heat radiation performance due to the high thermal conductivity may be secured in the electric vehicle battery case while securing excellent mechanical properties such as high strength, high hardness, a high elongation, and the like. The field of the electric vehicle battery case illustrated herein is merely one example of the application field of the composite material according to one embodiment of the present invention. Therefore, the composite material may be effectively applied to many other various fields. The composite material according to one embodiment of the present invention may be applied to various fields in which conventional aluminum-based metals or alloy materials have been applied.

Hereinafter, a specific example of the present invention will be presented to preferably implement the present invention. However, it should be understood that the scope of the present invention is not limited to the forms as in the following example, and the example is merely provided to aid in understanding the embodiments of the present invention. Therefore, it is apparent to those skilled in the art that various changes and modifications may be made by addition, deletion, and substitution of the configurations of the present invention without departing from the scope of the present invention.

EXAMPLE

An aluminum molten metal obtained by heating aluminum (commercially available from Hanjin Metal Co., Ltd.) to a temperature of approximately 780° C. to melt the aluminum was prepared.

A ZnO nanopowder (commercially available from Nano, Future and Life, Inc.; average diameter: 20 nm) was added to the molten metal at a content of 2% by weight based on the total weight of the molten metal.

Next, the nanopowder was dispersed in the molten metal to form a plurality of band structures. In this case, a mechanical stirring apparatus was used to disperse the nanopowder. Here, conditions of a speed of 350 rpm and a powder input rate of 30 g/min were used as the stirring conditions. Stirring was carried out for 30 minutes. As a result, it can be seen that the band structures were dispersed in the form of a plurality of bands having an average width of approximately 30 nm.

Figure 17:
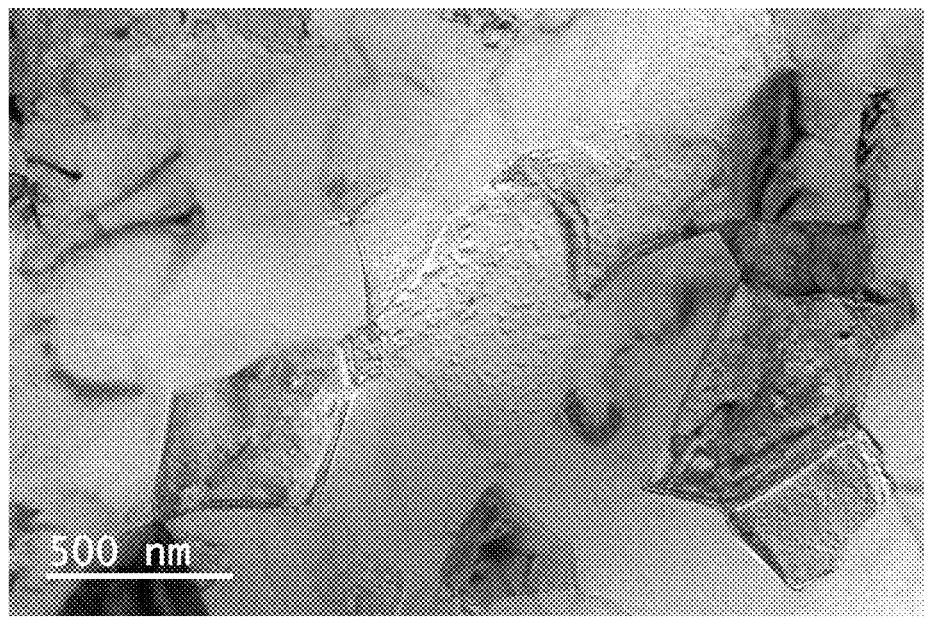
FIG. 17 is an image obtained by photographing an organized structure of the composite material including an aluminum-based matrix manufactured according to one preferred embodiment of the present invention.

After it was confirmed that the band structures were sufficiently dispersed, the molten metal was continuously cast into the form of slabs, and then solidified to manufacture cast material, which corresponded to the composite material including an aluminum matrix as shown in FIGS. 2 and 17 of the present invention.

According to the embodiments of the present invention, because the self-organized phase having a band structure is included in the aluminum-based matrix, a composite material including an aluminum-based matrix, which has high elongation performance (i.e., a high elongation) and also exhibits excellent mechanical properties such as strength, can be obtained. According to the embodiments of the present invention, a composite material including an aluminum-based matrix, which has excellent mechanical properties and also exhibits improved thermal conductivity characteristics, can also be obtained. The composite material including an aluminum-based matrix according to the embodiments can be effectively applied to various fields because the composite material can have high elongation, high strength, and excellent thermal conductivity characteristics.

Although preferred embodiments of the present invention have been described using specific terms throughout this specification, they are merely used as general meanings to easily describe the technical contents of the present invention and aid in understanding the present invention, and are not intended to limit the scope of the present invention. It is apparent to those skilled in the art to which the present invention pertains that various modifications and variations of the embodiments can be made by a person having an ordinary skill in the art without departing from the scope of the present invention. Those having ordinary skill in the art will appreciate that various substitutions, changes, and modification can be made to the composite material including an aluminum-based matrix according to the embodiments described with reference to FIGS. 1 to 16 without departing from the scope of the present invention. Therefore, the scope of the present invention is not defined by the foregoing embodiments, but rather defined by the appended claims of the present invention.

BRIEF DESCRIPTION OF MAJOR PARTS IN DRAWINGS

AM10: aluminum-based matrix
G10: grain
GB1: grain boundary
SG10: sub-grain
SGB10: sub-grain boundary
SP10: self-organized phase

What is claimed is:
1. A composite material comprising an aluminum-based matrix, comprising:
an aluminum-based matrix comprising a plurality of grains, wherein each of the grains has a plurality of sub-grains; and a self-organized phase present at a sub-grain boundary between the plurality of sub-grains, wherein the self-organized phase has a band structure and comprises a solid solution of aluminum and a non-metal element, wherein a deviation in lattice constant between the self-organized phase and the sub-grains is in a range of 1% to 5%, wherein a first sub-grain is provided on one side of the self-organized phase and a second sub-grain is provided on the other side of the self-organized phase, and a crystal orientation direction of the second sub-grain is tilted at an angle of 10 degree to 10 degree with respect to a crystal orientation direction of the first sub-grain.

2. The composite material of claim 1, wherein a plurality of dislocations spaced apart from each other are provided along the interface between the sub-grains and the self-organized phase coming into contact with the sub-grains.

3. The composite material of claim 1, wherein the self-organized phase has a lattice constant higher than those of the sub-grains.

4. The composite material of claim 1, wherein the self-organized phase has a lattice constant of 0.408 nm to 0.424 nm.

5. The composite material of claim 1, wherein the self-organized phase has a band width of 5 nm to 80 nm.

6. The composite material of claim 1, wherein the non-metal element comprises at least one selected from oxygen (O), carbon (C), and nitrogen (N).

7. The composite material of claim 1, wherein a content of the non-metal element in the self-organized phase is in a range of 0.01 to 10 at %.

8. The composite material of claim 1, wherein the aluminum-based matrix is an aluminum alloy.

9. The composite material of claim 1, wherein the aluminum-based matrix further comprises an additive element solid-soluble in aluminum,
wherein the additive element comprises at least one selected from scandium (Sc), yttrium (Y), titanium (Ti), zirconium (Zr), vanadium (V), chromium (Cr), manganese (Mn), iron (Fe), nickel (Ni), copper (Cu), silver (Ag), zinc (Zn), tungsten (W), silicon (Si), magnesium (Mg), calcium (Ca), strontium (Sr), and beryllium (Be).

10. The composite material of claim 1, wherein a plurality of self-organized phases are formed in a state in which the plurality of self-organized phases is dispersed in the aluminum-based matrix.

11. A device to which the composite material comprising an aluminum-based matrix defined in claim 1 is applied.

12. The device of claim 11, which comprises an electric vehicle battery case.

* * * * *